(12) United States Patent
Young

(10) Patent No.: US 8,774,015 B2
(45) Date of Patent: *Jul. 8, 2014

(54) DIGITAL SUBSCRIBER LINE (DSL) ACCESS MULTIPLEXER WIRING VALIDATION

(71) Applicant: AT&T Intellectual Property I, L.P., Atlanta, GA (US)

(72) Inventor: Randy S. Young, Lawrenceville, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/676,962

(22) Filed: Nov. 14, 2012

(65) Prior Publication Data

US 2013/0089128 A1    Apr. 11, 2013

Related U.S. Application Data

(63) Continuation of application No. 12/643,658, filed on Dec. 21, 2009, now Pat. No. 8,315,176, which is a continuation of application No. 11/299,706, filed on Dec. 12, 2005, now Pat. No. 7,656,811.

(51) Int. Cl.
| | |
|---|---|
| *G06F 11/263* | (2006.01) |
| *H04M 11/06* | (2006.01) |
| *H04L 12/26* | (2006.01) |
| *H04L 12/28* | (2006.01) |

(52) U.S. Cl.
CPC ........... *G06F 11/263* (2013.01); *H04M 11/062* (2013.01); *H04L 12/2856* (2013.01); *H04L 43/50* (2013.01)
USPC .......................... 370/248; 370/249; 379/26.01

(58) Field of Classification Search
USPC ................................. 379/15.01; 370/248, 249
See application file for complete search history.

(56) References Cited

U.S. PATENT DOCUMENTS

| | | |
|---|---|---|
| 4,042,887 A | 8/1977 | Mead et al. |
| 4,611,320 A | 9/1986 | Southard |
| 5,913,036 A | 6/1999 | Brownmiller et al. |
| 6,584,148 B1 | 6/2003 | Zitting et al. |
| 6,798,866 B1 | 9/2004 | Tennyson et al. |
| 6,885,730 B1 | 4/2005 | Bremer |

(Continued)

OTHER PUBLICATIONS

United States Patent and Trademark Office, "Non-Final Office Action," issued in connection with U.S. Appl. No. 11/299,706, on Jan. 7, 2009 (8 pages).

(Continued)

*Primary Examiner* — Sonia Gay
(74) *Attorney, Agent, or Firm* — Hanley, Flight & Zimmerman, LLC

(57) ABSTRACT

An example method involves electrically coupling first and second nodes of a device to a port of a digital subscriber line access multiplexer (DSLAM) and to a first end of a communication circuit. The communication circuit facilitates electrical coupling of the port of the DSLAM to a central office switch at a second end of the communication circuit. A signature circuit is electrically coupled between the first and second nodes to generate a signature signal in response to a test signal injected onto the communication circuit at a second end of the communication circuit. The signature signal has a magnitude substantially proportional to the test signal. First and second conductors of the communication circuit are electrically coupled to respective ones of the first and second nodes. Third and fourth conductors of the port of the DSLAM are electrically coupled to respective ones of the first and second nodes.

15 Claims, 3 Drawing Sheets

(56) References Cited

U.S. PATENT DOCUMENTS

| | | |
|---|---|---|
| 7,027,405 B1 | 4/2006 | Khadavi |
| 7,116,637 B2 | 10/2006 | Pines et al. |
| 7,502,327 B2 | 3/2009 | Burns et al. |
| 7,518,847 B2 | 4/2009 | Sharpe |
| 7,656,811 B2 | 2/2010 | Young |
| 2002/0021676 A1 | 2/2002 | Richardson |
| 2002/0064150 A1 | 5/2002 | Pines et al. |
| 2003/0078999 A1 | 4/2003 | Lund et al. |
| 2006/0067239 A1 | 3/2006 | Olinski |
| 2008/0013695 A1 | 1/2008 | Tennyson et al. |

OTHER PUBLICATIONS

United States Patent and Trademark Office, "Final Office Action," issued in connection with U.S. Appl. No. 11/299,706, on Aug. 18, 2009 (7 pages).

United States Patent and Trademark Office, "Notice of Allowance," issued in connection with U.S. Appl. No. 11/299,706, on Dec. 14, 2009 (5 pages).

United States Patent and Trademark Office, "Non-Final Office Action," issued in connection with U.S. Appl. No. 12/643,658, on Mar. 6, 2012 (7 pages).

United States Patent and Trademark Office, "Notice of Allowance," issued in connection with U.S. Appl. No. 12/643,658, on Jul. 18, 2012 (8 pages).

DIGITAL SUBSCRIBER LINE (DSL) ACCESS MULTIPLEXER WIRING VALIDATION

RELATED APPLICATION

This is a continuation of U.S. patent application Ser. No. 12/643,658, filed on Dec. 21, 2009, which is a continuation of U.S. patent application Ser. No. 11/299,706, filed on Dec. 12, 2005, now U.S. Pat. No. 7,656,811, all of which are hereby incorporated herein by reference in their entireties.

FIELD OF THE INVENTION

This invention relates to a DSLAM (Digital Subscriber Line Access Multiplexer) wiring validation methods and systems. More particularly, the invention relates to validating proper network connections between a DSLAM and the lines to a customer location.

BACKGROUND

When DSL service is added to the service for a telephone customer, a DSLAM (Digital Subscriber Line Access Multiplexer) must be added to the equipment and connected to the customer's telephone lines through a cross-box or other connection frame. The cross-box or connection frame may have many connections to many customers. A difficulty arises in that the technician making the connections in the cross-box may not properly connect the DSLAM to the customer's telephone lines. For example, the connection from the DSLAM may be made to another customer's lines rather than the telephone lines of the intended customer. When this occurs, the DSL modem at the customer's location will not synchronize with a DSLAM and the customer's DSL service will not activate.

From the perspective of the telephone company technician, the failure of the DSL service to activate could be an improper connection at the customer's location, or it could be an improper connection at the cross-box or connection frame connecting the DSLAM to the telephone lines for the customer. Accordingly, the telephone company does not know whether to dispatch a service person or technician to the customer's location or to dispatch a different service person to the telephone company equipment location containing the cross-box or connection frame connecting the DSLAM to the customer's telephone lines.

SUMMARY

In accordance with this invention, this problem and other problems have been addressed by placing a signature circuit on a low frequency side of a Digital Subscriber Line Access Multiplexer connection to the customer's lines. Using multiple loop testing techniques, the service technician can, from a central location, test the customer's connection to the DSLAM.

In one embodiment of the invention, a test system is provided to detect proper connection wiring in a connection frame between the customer's lines and the DSLAM. A multi-loop tester at a central office generates a test signal on low frequency lines to a customer's connection in a connection frame. A signature circuit is electrically connected between the customer's connection in the connection frame for the low frequency lines and the DSLAM. The signature circuit responds to the test signal and generates a signature signal. The multi-loop tester senses the signature signal to verify that there is proper connection wiring between the customer's lines and the DSLAM.

In another embodiment of the invention, a method is performed for testing for proper connection wiring in a connection frame between the customer's lines and the DSLAM. In the method, a test signal is generated over the low frequency lines from a central office through a connection for a customer in the connection frame to a signature circuit between the connection frame and the DSLAM. A signature signal is generated at the signature circuit in response to the test signal. The signature signal is detected on the low frequency lines to verify that the DSLAM is connected to the lines of the correct customer.

These and various other features as well as advantages, which characterize the present invention, will be apparent from a reading of the following detailed description and a review of the associated drawings.

DETAILED DESCRIPTION

Figure 1:
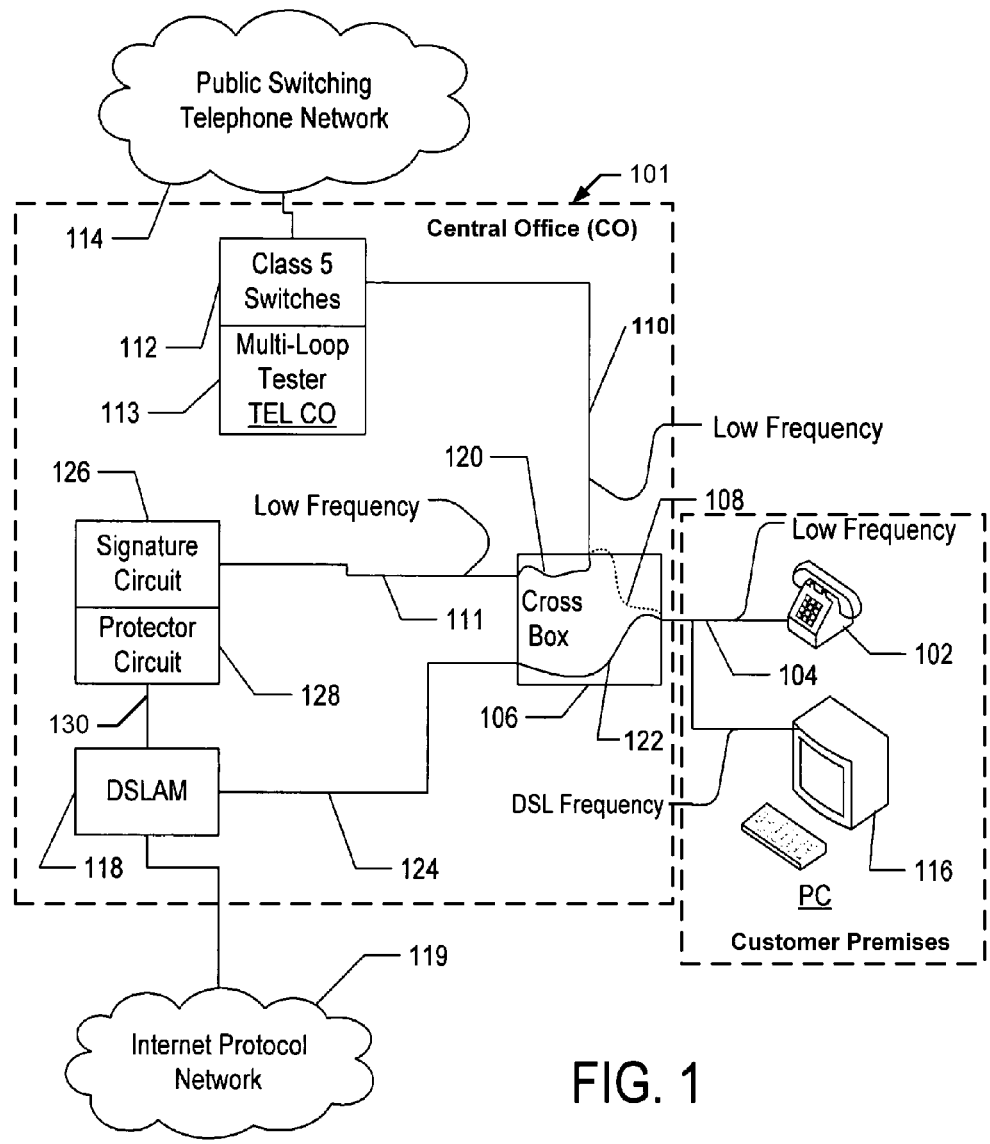
FIG. 1 shows a preferred embodiment of the invention with a signature circuit 126 located on the low frequency connection line between the cross-box and the DSLAM.

In FIG. 1, a customer's telephone 102 is connected via twisted pair lines 104 to a cross-box 106 at a central office (CO) 101. The cross-box 106 is commonly referred to in the industry as a main distribution frame (MDF). Typically, when the customer is being provided only Plain Old Telephone Service ("POTS"), then a connection in the cross-box or connection frame 106, connects the twisted pair lines 104 through connection wires 108 to low frequency lines 110 connected to Class 5 switches 112 at the CO 101. The Class 5 switches 112 interpret the dialed telephone number and work with the Public Switched Telephone Network ("PSTN") 114 to connect the customer's call to its destination.

When the customer has a personal computer 116 or otherwise wishes to add Digital Subscriber Line ("DSL") service, a DSL Access Multiplexer (DSLAM) 118 implemented at and/or in conjunction with the CO 101 is added to the circuit for the customer. Typically, the DSL service is used by the subscriber to connect to an Internet Protocol Network 119. To add the DSLAM 118, a low frequency side of the DSLAM 118 is connected to the low frequency lines 110 to the Class 5 switches 112. This connection is done by breaking or disconnecting connection lines 108 in the cross-box 106, and connecting the low frequency lines 110 to low frequency lines 111 with connection lines 120 in the cross-box 106, as shown in FIG. 1. At the same time, a connection passing all frequencies from the DSLAM 118 and the customer is made by adding connection lines 122 between the lines 104 and lines 124. Lines 104, 110, 111 and 124 are usually twisted pair lines. Now there is a twisted pair connection from the customer's lines 104 through the connection lines 122 and through lines 124 to DSLAM 118. If the connection lines 120 and 122 are not properly installed, then the DSL service to the customer will not operate.

As illustrated in FIG. 1, to test the proper connection of the DSLAM 118 to the customer lines 110 via the cross-box 106, a multi-loop tester 113 at the CO 101 provides a test signal over the low frequency lines 110, 111 and the connecting lines 120 to a signature circuit 126 implemented in connection with the DSLAM 118. The signature circuit 126 will generate a signature signal in response to this test signal, which may be subsequently detected by the multi-loop tester 113 of the CO 101 through the low frequency lines 110, 111 and connecting lines 120, and Class 5 switches 112. One embodiment for the signature circuit 126 will be described hereinafter with references to FIGS. 2 and 3.

The signature circuit 126 might be most easily applied to the network by incorporating it into a protector circuit 128. The protector circuit 128 is used to protect the DSLAM 118 from voltage or current surges due to lightning strikes. As is well known, such lightning strikes can occur anywhere and, thus, may induce voltages and/or currents on any of the lines 104, 108, 110, 111, 122, 124 and 130 and/or, more generally, within any of the devices and/or systems illustrated in FIG. 1. As shown in FIG. 1, the protector circuit 128 is coupled to the DSLAM 118 via internal and/or external lines 130. Thus, the protector circuit 128 and the signature circuit 126 may be integral to the DSLAM 118 and/or be distinct from the DSLAM 118. These protector circuits 128 are regularly serviced and replaced. Accordingly, incorporating the signature circuit 126 into the protector circuit 128 provides an easy method for installing the signature circuit 126. A test signal to test low frequency lines 110 and 111 and their proper connection through line 120 in the cross-box 106 is supplied from the multi-loop tester 113 through the Class 5 switches 112.

Figure 2:
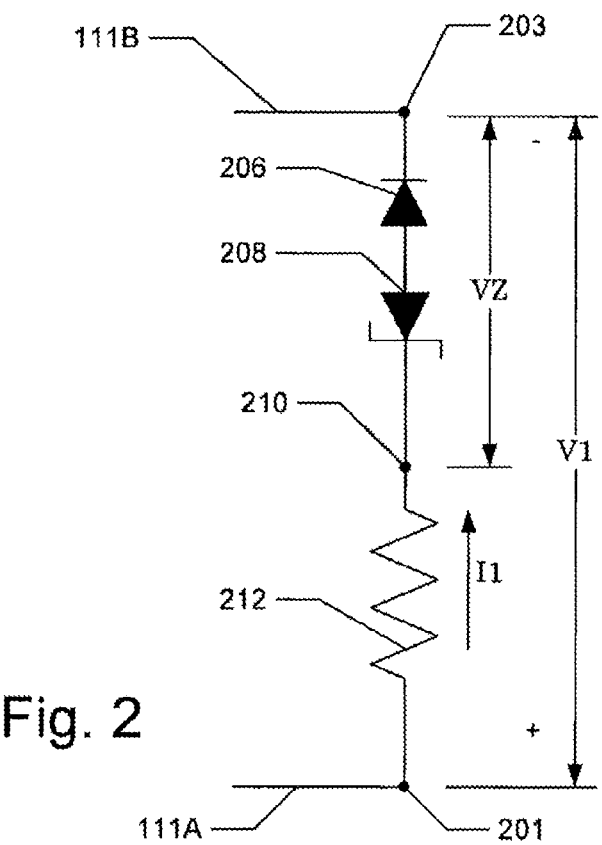
FIG. 2 shows one embodiment of a signature circuit.

FIG. 2 shows one preferred embodiment for the signature circuit 126. The voltage polarity of the test signal is indicated in FIG. 2 between line 111A and line 111B (i.e. wires of twisted pair line 111 of FIG. 1). Diode 206 allows current to flow only from node 201 to node 203. However, an avalanche break-down diode, or zener diode, 208 will not permit a current flow I1 until the voltage across zener diode 208 exceeds its breakdown voltage VZ. When this occurs, the voltage between nodes 210 and 203 will be very close to the break-down voltage VZ for the zener diode 208 as the forward bias voltage across diode 206 will be very small.

Above the breakdown voltage VZ of zener diode 208, current I1 will flow through resistor 212, zener diode 208, and diode 206 and the magnitude of such current will be substantially equal to (V1-VZ)/R the resistance of resistor 212. Thus, by applying a voltage pulse greater than VZ between lines 111A and 111B and observing the current through the lines 111A and 111B during the pulse, a proper connection at the DSLAM 118 can be tested remotely from the CO 101.

Figure 3:
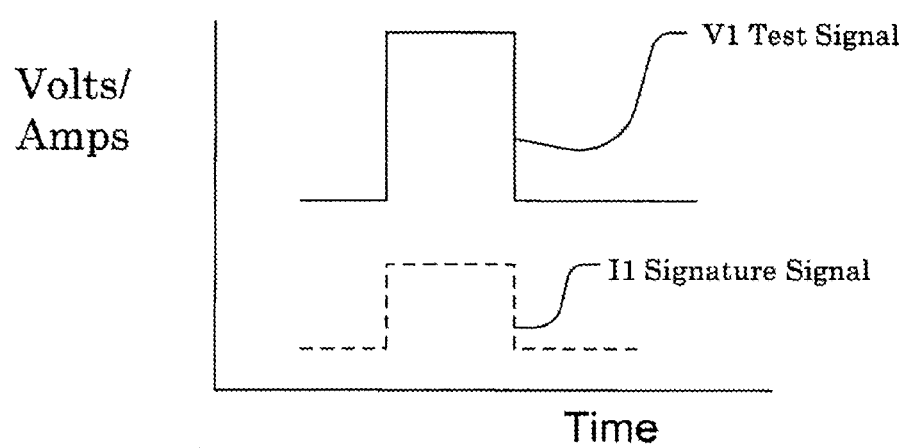
FIG. 3 illustrates a test signal generated during multi-loop testing to determine whether the DSLAM is properly connected to the customer's lines.

In FIG. 3, the voltage pulse V1 is the test signal, and the resultant current signal I1 is the signature signal. When a test signal V1 (voltage pulse for example) is applied on twisted pair wires 111A and 111B and the magnitude of the pulse exceeds the breakdown voltage VZ of the zener diode 208, current will flow through the signature circuit 126, and this current can be sensed as the signature signal. If the signature circuit 126 does not detect the test signal and generate the signature signal, then it is likely that the connection line 120 (FIG. 1) in the cross-box 106 has been improperly installed.

Of course other signature circuits might be designed to provide a voltage response, a frequency response, or a phase response. If the test signal were a frequency signal, the signature circuit would be designed to detect the test frequency signal and generate and return a signature frequency to the tester at the central office. The signature frequency would differ from the test frequency. If the test signal were a phase signal, the test signal would be transmitted as frequency pulses at a predetermined phase, The signature circuit would detect the frequency pulses, and send back to the central office frequency pulses with the phase shifted relative to the test signal pulses.

Figure 4:
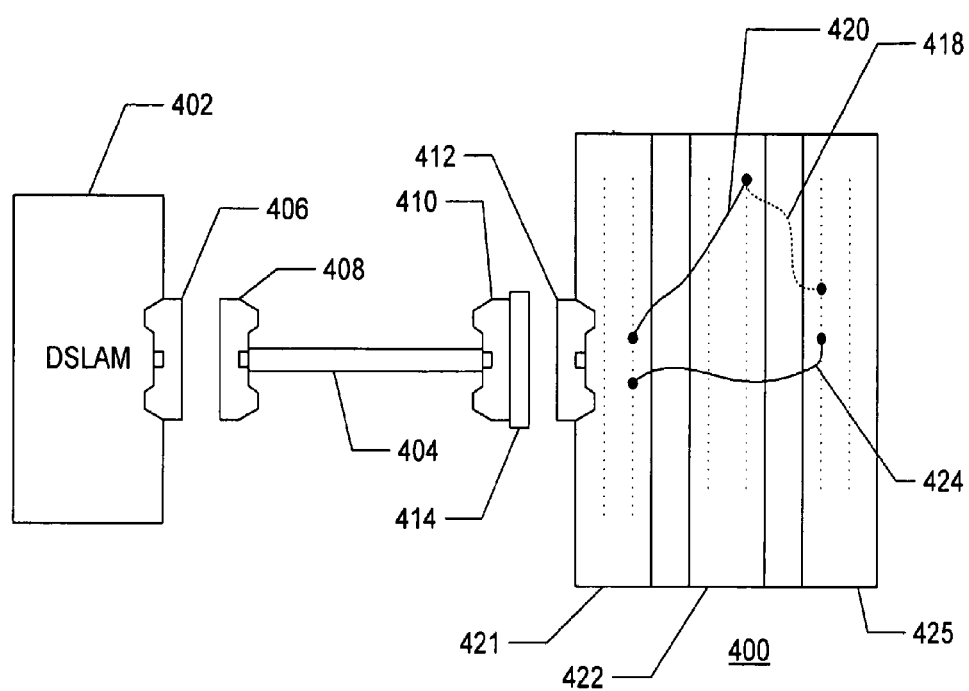
FIG. 4 shows another preferred embodiment where the signature circuit is located in a connecting shoe 414 for cable connectors between a DSLAM and a connection frame.

In FIG. 4, a DSLAM 402 is connected to a cross-connection frame 400 through a cable 404 carrying multiple paired wires for multiple lines. Each wire pair pin connection in the cable 404 will have a pair of pins in the connector 410. FIG. 4 illustrates an embodiment of the testing system and method where a signature circuit is embodied in a shoe 414 plugged between connectors 410 and 412. In the shoe there are multiple signature circuits—one signature circuit between each telephone-line, wire-pair connection in the shoe. Each signature circuit in test shoe 414 can be installed to connect between each pair of pins.

Between one of connectors 406 and 408 or connectors 410 and 412, a signature circuit test shoe 414 is inserted. In FIG. 4, the test shoe 414 has pins that plug into sockets of connector 410. The test shoe 414 has sockets to receive pins (not shown) of connector 412. Thus, test shoe 414 is connected between connector 410 and connector 412.

Connector 412 connects to the connection frame 400 where wiring patches are made to connect the DSLAM 412 to the customer's lines. Without DSL service, the customer lines would be connected by patch lines 418. With DSL service, the patch lines 418 are disconnected and low frequency patch lines 420 are connected between a DSLAM connection array 421 and a public switching telephone connection array 422. Patch lines 424 are connected between the DSLAM connection array 421 and a customer connection array 425.

A particular signature circuit has been shown and described, but it will be appreciated by one skilled in the art that any number of voltage signal, current signal, frequency signal, signature devices could be inserted as a signature circuit to implement the present invention.

While the invention has been particularly shown and described with referenced to preferred embodiments thereof, it will be understood by those skilled in the art that various other changes in the form and details may be made therein without departing from the spirit and scope of the invention.

What is claimed is:

1. A method comprising:

electrically coupling first and second nodes of a device to a port of a digital subscriber line access multiplexer and to a first end of a communication circuit, the communication circuit to facilitate electrical coupling of the port of the digital subscriber line access multiplexer to a central office switch at a second end of the communication circuit; and electrically coupling a signature circuit between the first and second nodes to generate a signature signal in response to a test signal injected onto the communication circuit at a second end of the communication circuit, the signature signal having a magnitude substantially proportional to the test signal, wherein first and second conductors of the communication circuit are electrically coupled to respective ones of the first and second nodes, and wherein third and fourth conductors of the port of the digital subscriber line access multiplexer are electrically coupled to respective ones of the first and second nodes.

2. A method as defined in claim 1, further comprising providing the signature circuit with a lightning protection circuit to suppress at least one of a lightning induced voltage or a lightning induced current.

3. A method as defined in claim 2, wherein the signature circuit and the lightning protection circuit are in the digital subscriber line access multiplexer.

4. A method as defined in claim 1, wherein the second end of the communication circuit is proximate to the central office switch.

5. A method as defined in claim 1, further comprising selecting the signature circuit to provide the signature signal as one of a signature voltage response, a signature frequency response, or a signature phase response in response to the test signal.

6. A method comprising:
electrically coupling first and second nodes of a device to a port of a digital subscriber line access multiplexer and to a first end of a communication circuit, the communication circuit to facilitate electrical coupling of the port of the digital subscriber line access multiplexer to a central office switch at a second end of the communication circuit; and
electrically coupling a signature circuit between the first and second nodes to generate a signature signal in response to a test signal injected onto the communication circuit at a second end of the communication circuit, the signature signal having a magnitude substantially proportional to the test signal, wherein the signature circuit comprises:
a first diode having a first negative terminal electrically coupled to the first node;
a second diode having a first positive terminal electrically coupled to a second positive terminal of the first diode; and
a resistor electrically coupled between a second negative terminal of the second diode and the second node.

7. A method as defined in claim 6, further comprising providing the signature circuit with a lightning protection circuit to suppress at least one of a lightning induced voltage or a lightning induced current.

8. A method as defined in claim 7, wherein the signature circuit and the lightning protection circuit are in the digital subscriber line access multiplexer.

9. A method as defined in claim 6, wherein the second end of the communication circuit is proximate to the central office switch.

10. A method as defined in claim 6, further comprising selecting the signature circuit to provide the signature signal as one of a signature voltage response, a signature frequency response, or a signature phase response in response to the test signal.

11. A method comprising:
electrically coupling first and second nodes of a device to a port of a digital subscriber line access multiplexer and to a first end of a communication circuit, the communication circuit to facilitate electrical coupling of the port of the digital subscriber line access multiplexer to a central office switch at a second end of the communication circuit; and
electrically coupling a signature circuit between the first and second nodes to generate a signature signal in response to a test signal injected onto the communication circuit at a second end of the communication circuit, the signature signal having a magnitude substantially proportional to the test signal, further comprising a cable connector housing, wherein the signature circuit is implemented within the cable connector housing.

12. A method as defined in claim 11, further comprising providing the signature circuit with a lightning protection circuit to suppress at least one of a lightning induced voltage or a lightning induced current.

13. A method as defined in claim 12, wherein the signature circuit and the lightning protection circuit are in the digital subscriber line access multiplexer.

14. A method as defined in claim 11, wherein the second end of the communication circuit is proximate to the central office switch.

15. A method as defined in claim 11, further comprising selecting the signature circuit to provide the signature signal as one of a signature voltage response, a signature frequency response, or a signature phase response in response to the test signal.

* * * * *